United States Patent [19]
Roberson

[11] Patent Number: 5,478,101
[45] Date of Patent: Dec. 26, 1995

[54] ALIGNMENT DEVICE FOR A TRAILER HITCH

[76] Inventor: Robert L. Roberson, 230 E. Broad St., Cookeville, Tenn. 38501

[21] Appl. No.: 267,354

[22] Filed: Jun. 29, 1994

[51] Int. Cl.[6] .................................................. G02B 7/198
[52] U.S. Cl. ........................ 280/477; 248/467; 248/484; 359/872
[58] Field of Search .............................. 280/477; 33/264; 248/467, 474, 475.1, 476, 479, 481, 484; 40/642, 643, 644; 359/872, 881

[56] References Cited

U.S. PATENT DOCUMENTS

| | | | |
|---|---|---|---|
| 2,413,894 | 1/1947 | Sorensen | 248/481 |
| 2,999,427 | 9/1961 | Newcomb | 248/479 |
| 3,778,016 | 12/1973 | Gernhardt | 248/475.1 |
| 3,889,384 | 6/1975 | White | 33/264 |
| 4,858,966 | 1/1975 | Lowell | 280/477 |
| 4,905,376 | 3/1990 | Neeley | 280/477 |
| 4,940,320 | 7/1990 | Tribble | 359/881 |
| 5,113,588 | 5/1992 | Walston | 280/477 |
| 5,120,015 | 6/1992 | do Espirito Santo | 248/479 |

*Primary Examiner*—Anne Marie Boehler
*Attorney, Agent, or Firm*—Michael I. Kroll

[57] ABSTRACT

An alignment device for a trailer hitch which detachably mounts to a tailgate of a pickup truck for visually aligning a hitch ball on a drop hitch bumper of the pickup truck with a coupler on a tow bar of a trailer. The device comprising a reflecting element. A structure is for supporting the reflecting element. A facility is for attaching the reflecting element to the supporting structure in an adjustable manner. A unit is for mounting the supporting structure to the tailgate of the pickup truck in a detachable manner. An assembly is for securing the mounting unit to the supporting structure in an adjustable manner. A driver can look into a rearview mirror of the pickup truck and see within the reflecting element the hitch ball which will align up and engage with the coupler.

1 Claim, 2 Drawing Sheets

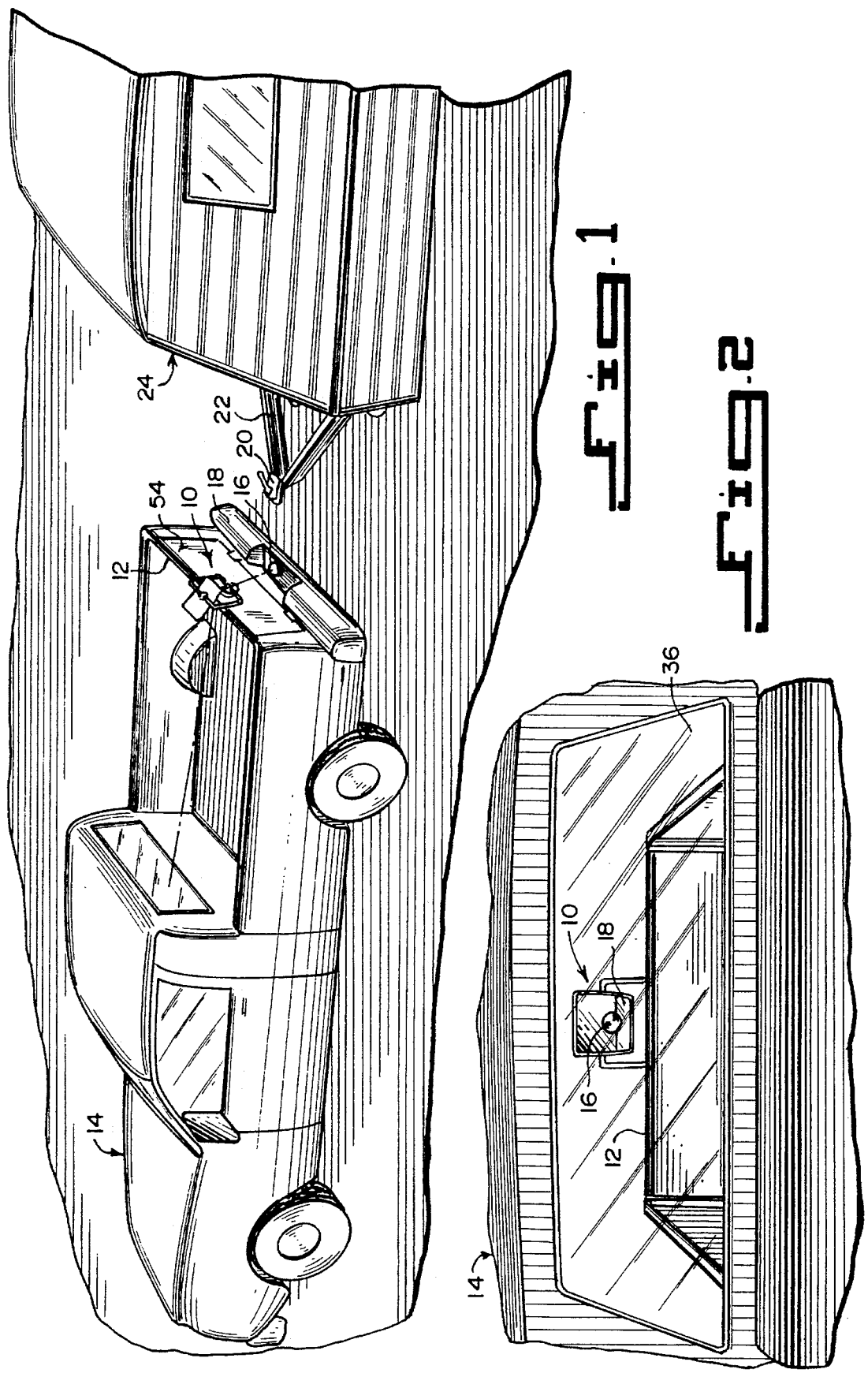

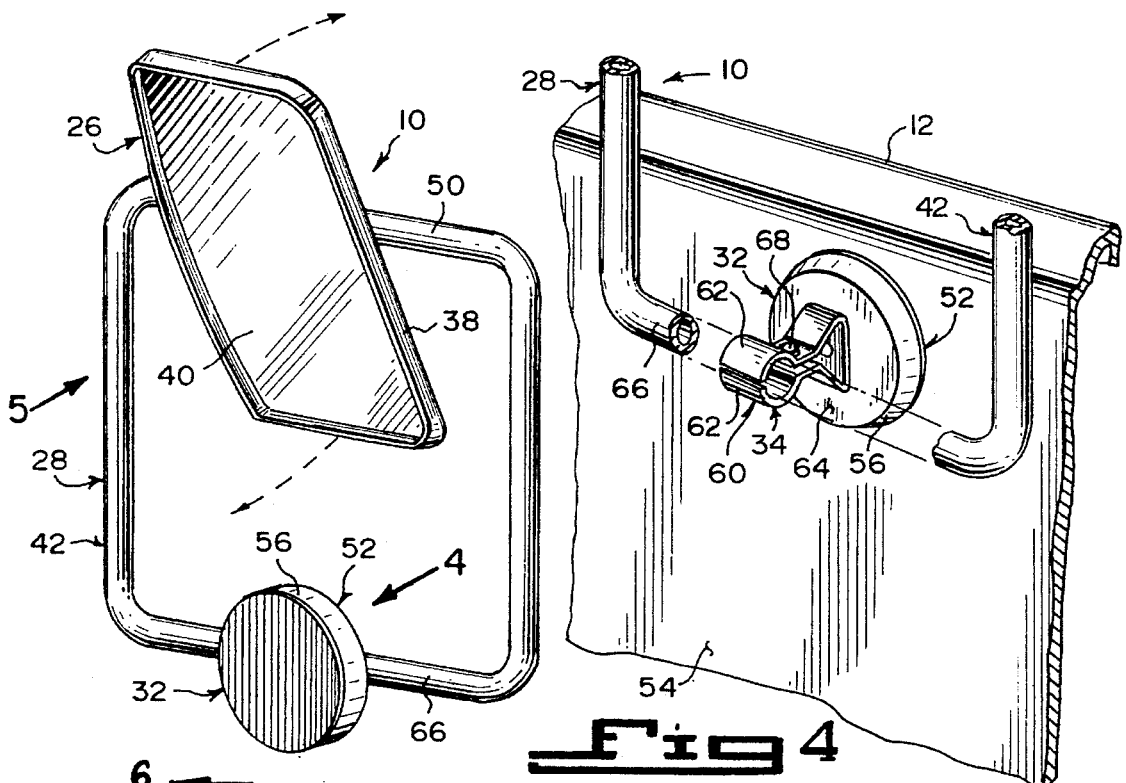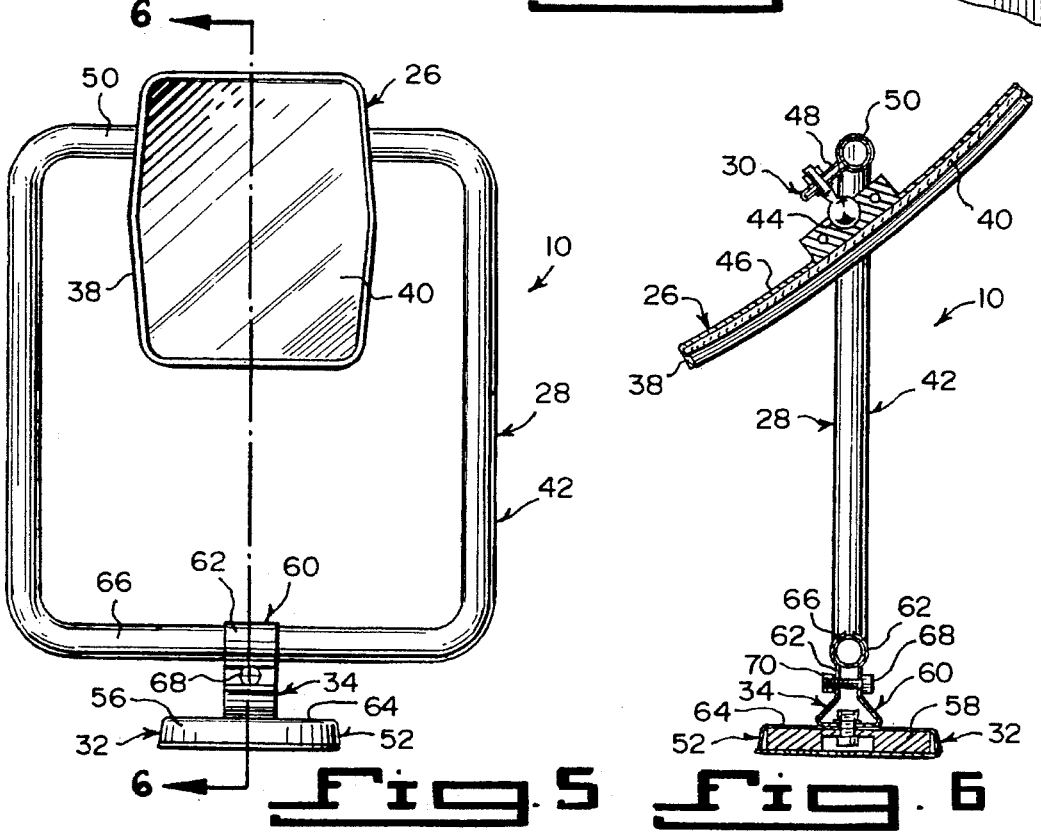

ALIGNMENT DEVICE FOR A TRAILER HITCH

BACKGROUND OF THE INVENTION

1. Field of the Invention

The instant invention relates generally to motor vehicle mirror assemblies and more specifically it relates to an alignment device for a trailer hitch.

2. Description of the Prior Art

Numerous motor vehicle mirror assemblies have been provided in prior art. For example U.S. Pat. Nos. 3,542,456 to Huge; 3,858,966 to Lowell, Jr.; 4,441,682 to Su; 4,747,679 to Beach, Jr.; 4,905,376 to Neeley and 5,180,182 to Haworth all are illustrative of such prior art. While these units may be suitable for the particular purpose to which they address, they would not be as suitable for the purposes of the present invention as heretofore described.

HUGE, ROGER W.

AUXILIARY REAR VIEW MIRRORS FOR AUTOMOBILES AND THE LIKE

U.S. Pat. No. 3,542,456

An auxiliary rearview mirror structure for temporary use on an automobile when towing a trailer or other conveyance. A mirror is adjustably mounted on each end of a tubular frame member which extends laterally across the hood of the automobile. The tubular member is arched to insure clearance over a crown in the hood and is fastened to each side of the hood by two suction cups and by a strap which extends between the hood and the fender and under the hood to attach to a structural member of the hood. since the auxiliary mirror structure is supported entirely by the hood, it permits the hood to be raised and lowered with it mounted thereon.

LOWELL, JR., PERCIVAL DAVIS

APPARATUS FOR FACILITATING TRAILER HITCH ELEMENT ALIGNMENT

U.S. Pat. No. 3,858,966

Apparatus for facilitating the substantially vertical alignment of a trailer hitch element carried by a moving draft vehicle with a trailer hitch element carried by a stationary trailer vehicle. A device for linearly interconnecting, within the limits thereof, the trailer vehicle and the draft vehicle has a portion connected at an extremity thereof to the rear of the draft vehicle on the center line thereof. Another portion of the device is positioned above the trailer vehicle carried trailer hitch element and is interconnected with the trailer vehicle for rotation with respect to a substantially vertically disposed axis passing substantially centrally through the trailer vehicle carried trailer hitch element. The apparatus also includes a mirror positioned above the device for linearly interconnecting within the limits thereof. The trailer vehicle and the draft vehicle and similarly is rotatable therewith about the substantially vertically disposed axis. The mirror faces towards the rear of the moving draft vehicle to afford the operator thereof a reflected view of at least a portion of the trailer vehicle carried trailer hitch element as well as with a reflected view of at least a portion of the device for linearly interconnecting, within the limits thereof, the trailer vehicle and the draft vehicle. The apparatus further includes an indicator element positioned above the mirror and viewable thereover under certain circumstances although preferably facing in a direction opposite the direction in which the mirror faces. The indicator element also is similarly rotatable with respect to the substantially vertically disposed axis together with the mirror and with the device for linearly interconnecting, within the limits thereof, the trailer vehicle and the draft vehicle.

SU, FU-CHU

REAR VIEW MIRROR LOCKING MECHANISM

U.S. Pat. No. 4,441,682

A rear-view-mirror locking mechanism for a car comprises a longitudinal arm for holding the mirror and a U-shaped supporting bar coupled with the longitudinal arm through a locking screw and two spacing plates thereof. By turning the screw to abut tightly against the surface of the longitudinal arm, the supporting bar and the longitudinal arm are locked in a fixed position, secured at the fender of the car thus holding the mirror firmly.

BEACH, JR., THEODORE L.

MIRROR HEAD ASSEMBLY FOR TRUCKS

U.S. Pat. No. 4,747,679

A side mounted rear view mirror head assembly for trucks includes a mirror head formed with a sheet metal back or cover and a mirror, enclosed between a pair of end caps, in which an integral extended portion of the end caps define lateral slots providing for corresponding lateral adjusting movement of a mirror head on a generally U-shaped support arm. The mirror head itself includes a square tie bar which extends between the end caps and is fitted into tie bar engaging bosses in the end caps, to resist twisting of one end cap with respect to the other, and to stiffen the mirror head.

NEELEY, ROGER P.

APPARATUS FOR FACILITATING TRAILER HITCH ELEMENT ALIGNMENT

U.S. Pat. No. 4,905,376

A hitch viewing mirror assembly detachably mounts directly to the tow vehicle by either a special tail-gate clamping means for a pick-up truck or a magnetic mount for a passenger car. The tow operator may view the tow vehicle hitch member and the trailer hitch member while operating the tow vehicle during the coupling process thereby providing a particularly effective method of aligning the position of the hitch members.

HAWORTH, JAMES R.

TRAILER HITCH ALIGNMENT DEVICE

U.S. Pat. No. 5,180,182

The trailer hitch alignment device includes a base member upon which a convex mirror is fixed. Two side members are hingedly attached to opposing edges of the base member, so as to fold in sequence across the mirror in the closed position or to expose the mirror in the open position. The side members each have an angled slot, formed in the edge opposing the hinged edge. With the side members in the opened position, the angled slots are aligned to readily engage the top edge of a closed towing vehicle tailgate, so as to support the base member and mirror in a position enabling observation from the driver's position of the relative movement of the towing hitch to the coupling of the towed vehicle. In the open position, the side members will open through an obtuse angle to a position limited by a stop formed on the hinge edge of the side members.

SUMMARY OF THE INVENTION

A primary object of the present invention is to provide an alignment device for a trailer hitch that will overcome the shortcomings of the prior art devices.

Another object is to provide an alignment device for a trailer hitch in which an adjustable mirror is applied to a tailgate of a pickup truck, so that the driver can see how to align a hitch ball with a tow bar coupler on a trailer through the rearview mirror of the pickup truck.

An additional object is to provide an alignment device for a trailer hitch in which the adjustable mirror is on an upper portion of a frame, while an adjustable magnetic base on a lower portion of the frame will maintain the frame in position against the tailgate of the pickup truck.

A further object is to provide an alignment device for a trailer hitch that is simple and easy to use.

A still further object is to provide an alignment device for a trailer hitch that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

FIG. 1 is a perspective view of the instant invention applied to a tailgate of a pickup truck being used in aligning a hitch ball to the tow bar coupler of a trailer.

FIG. 2 is an elevational view of the rearview mirror in the pickup truck showing the instant invention in position on the tailgate.

FIG. 3 is a front perspective view of the instant invention per se.

FIG. 4 is a rear perspective view taken in the direction of arrow 4 in FIG. 3 with parts broken away, showing the magnetic base applied to the tailgate.

FIG. 5 is a front view taken in the direction of arrow 5 in FIG. 3 with the magnetic base turned down.

FIG. 6 is a cross sectional view taken along line 6—6 in FIG. 5.

DETAILED DESCRIPTION OF THE PREFERRED EMBODIMENTS

Turning now descriptively to the drawings, in which similar reference characters denote similar elements throughout the several views, FIGS. 1 through 6 illustrate an alignment device 10 for a trailer hitch which detachably mounts to a tailgate 12 of a pickup truck 14 for visually aligning a hitch ball 16 on a drop hitch bumper 18 of the pickup truck 14 with a coupler 20 on a tow bar 22 of a trailer 24.

The device 10 comprises a reflecting element 26. A structure 28 is for supporting the reflecting element 26. A facility 30 is for attaching the reflecting element 26 to the supporting structure 28 in an adjustable manner. A unit 32 is for mounting the supporting structure 28 to the tailgate 12 of the pickup truck 14 in a detachable manner. An assembly 34 is for securing the mounting unit 32 to the supporting structure 28 in an adjustable manner. A driver can look into a rearview mirror 36 of the pickup truck 14 and see within the reflecting element 26 the hitch ball 16, which will align up and engage with the coupler 20.

The reflecting element 26 includes a housing 38 and a mirror 40 affixed within the housing 38. The supporting structure 28 is a frame member 42. The frame member 42 is in an 0-shaped configuration and is tubular in cross section.

The attaching facility 30 consists of a ball and socket joint 44 extending from a back surface 46 of the housing 38. A clamp member 48 transversely extends from the ball and socket joint 44 to an upper portion 50 of the frame member 42.

The mounting unit 32 is a magnetic base 52 which is applied against an outer surface 54 of the tailgate 12 that is made out of steel. The magnetic base 52 includes an outer cap cover 56 and an inner magnet core 58 retained within the outer cap cover 56.

The securing assembly 34 is a bracket 60 having two locking arms 62 extending between a rear surface 64 of the outer cap cover 56 and a lower portion 66 of the frame member 42. A bolt 68 extends through the two locking arms 62. A nut 70 is threaded onto the bolt, so that the two locking arms 62 will tightly engage with the lower portion 66 of the frame member 42 to maintain the magnetic base 52 in position.

OPERATION OF THE INVENTION

To use the alignment device 10 the following steps should be taken:

1. Loosen the bolt 68 and the nut 70 on the two locking arms 62, to release the bracket 60 from the lower portion 66 of the frame member 42.

2. Turn the magnetic base 52, so that the magnetic base 52 is at a right angle to the frame member 42.

3. Tighten the bolt 68 and the nut 70 so that the locking arms 62 of the bracket 60 will grip the lower portion 66 of the frame member 42.

4. Place the magnetic base 52 against the outer surface 54 of the tailgate 12.

5. Adjust the clamp member 48 on the upper portion 50 of the frame member 42.

6. Swivel the housing 38 on the ball and socket joint 44, so that the mirror 40 will reflect the hitch ball 16 into the rear view mirror 38 in the pickup truck 14.

7. Back up the pickup truck 14 until the coupler 20 is seen in the rearview mirror 36 reflected from the mirror 40 engaging with the hitch ball 16.

8. Stop the pickup truck 14 so that there will be no damage done to the tailgate 12 and to the tow bar 22 on the trailer 24.

LIST OF REFERENCE NUMBERS 10 alignment device
12 tailgate 14 pickup truck
16 hitch ball
18 drop hitch bumper on 14
20 coupler
22 tow bar
24 trailer
26 reflecting element
28 supporting structure
30 attaching facility
32 mounting unit
34 securing assembly
36 rearview mirror
38 housing of 26
40 mirror in 38
42 frame member for 28
44 ball and socket joint
46 back surface of 38
48 clamp member
50 upper portion of 42
52 magnetic base for 32
54 outer surface of 12
56 outer cap cover
58 inner magnet core
60 bracket
62 locking arm of 62
64 rear surface of 56
66 lower portion of 42
68 bolt
70 nut It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. An alignment device for a trailer hitch which detachably mounts to a steel tailgate of a pickup truck for visually aligning a hitch ball on a drop hitch bumper of the pickup truck with a coupler on a tow bar of a trailer, said device comprising:

a) a reflecting element comprising a housing and a mirror affixed within said housing;

b) means for supporting said reflecting element comprising a frame member tubular in cross section and formed into an O-shaped configuration;

c) means for attaching said reflecting element to said supporting means in an adjustable manner comprising a ball and socket joint extending from a back surface of said housing to permit orientation of said mirror and a clamp member transversely extending from said ball and socket joint to an upper portion of said frame member to permit easy removal and relocation of said mirror;

d) means for mounting said supporting means to the tailgate of the pickup truck in a detachable manner comprising a magnetic base for attaching said alignment device on an outer surface of said tailgate, said magnetic base including an outer cap cover and an inner magnetic core retained within said outer cap cover; and e) means for securing said mounting means to said supporting means in an adjustable manner comprising a bracket having two locking arms extending between a rear surface of said outer cap cover and a lower portion of said frame member and a bolt extending through said two locking arms and a nut threaded onto said bolt to tightly engage the two locking arms with the lower portion of said frame member to maintain said magnetic base in position, so that a driver can look into a rearview mirror of the pickup truck and see within said reflecting element the hitch ball which will align up and engage with the coupler.

\* \* \* \* \*